B. A. STOCKING.
DEMOUNTABLE RIM.
APPLICATION FILED MAY 18, 1917.
1,338,110.
Patented Apr. 27, 1920.
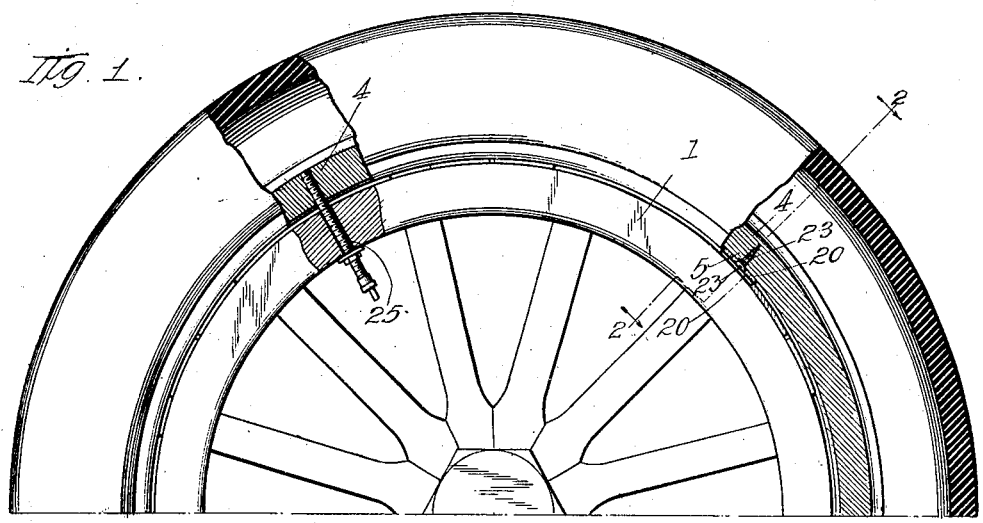
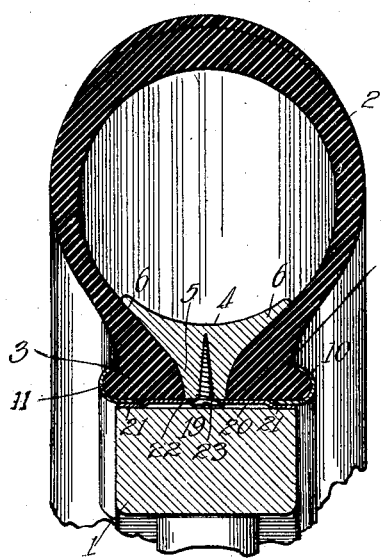 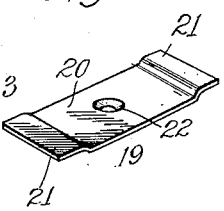 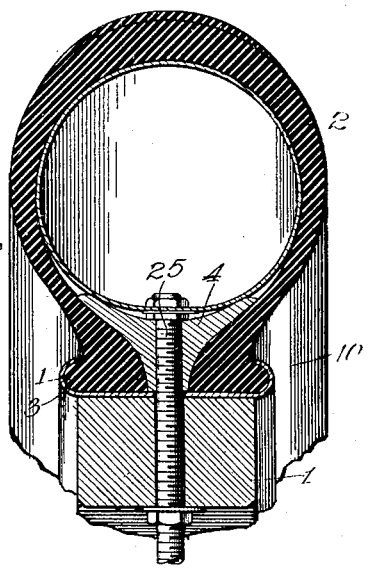
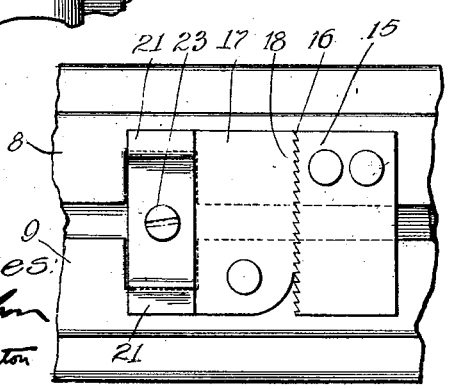 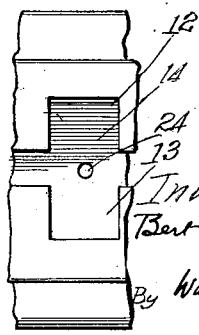

UNITED STATES PATENT OFFICE.

BERT A. STOCKING, OF BOONE, IOWA.

DEMOUNTABLE RIM.

1,338,110. Specification of Letters Patent. Patented Apr. 27, 1920.

Application filed May 18, 1917. Serial No. 169,383.

*To all whom it may concern:*

Be it known that I, BERT A. STOCKING, a citizen of the United States, residing at Boone, in the county of Boone and State of Iowa, have invented certain new and useful Improvements in Demountable Rims, of which the following is the specification.

This invention relates to a tire construction and particularly to a demountable rim for tires.

It is an object of my invention to provide a demountable rim of simple construction which may be applied to any fellies now in use without modification thereof.

It is another object of my invention to provide a construction wherein the inner tube of a tire may be dispensed with.

It is another object of my invention to provide a demountable rim which may be attached to a tire by very simple manipulation and when so attached to the tire will be ready for application to the felly by the ordinary means for such adjustment now upon the market.

It is another object of my invention to provide a demountable rim comprising a block ring to be applied inside the tire and a split rim to engage the tire wherein the split rim is provided with adjustable locking means whereby it may always be locked in a position of tight engagement with a tire independently of the felly.

Further objects and advantages of my invention will appear as the description to follow proceeds.

In the drawings, Figure 1 is an elevation of a wheel provided with a demountable rim constructed according to my invention.

Fig. 2 is a sectional view of a portion of the wheel provided with the demountable rim of my invention.

Fig. 3 is a sectional view of the same showing the tire provided with an inner tube and the means for accommodating the valve.

Fig. 4 is a plan view of a portion of my demountable rim and attached tire taken from inside the tire.

Fig. 5 is a perspective view of the locking block.

In the drawings, 1 represents the felly of an ordinary automobile or other wheel upon which my demountable rim is to be attached. 2 represents a tire of usual construction provided with the beaded edges 3. I provide a solid block ring 4 having a depending rib 5 to project between the edges of the tire, flanges 6 projecting considerably up the sides thereof on the interior. The outer sides of the block 4 are shaped to accurately conform to the shape of the interior of the edges of the tire so that the edges of the tire may be firmly seated thereagainst. I further provide a split rim comprising halves 8 and 9 each provided, as is customary, with the inwardly curved edges 10 and 11. At a number of points about the circumference the rim sections 8 and 9 are provided with corresponding recesses 12 and 13 which when in register form slots 14. Rigidly secured to one of the halves of the split rim is a locking plate 15 having a serrated edge 16. Pivotally secured to the other half of the split rim is a corresponding plate 17 having a serrated edge 18, these plates being so arranged that the adjacent edge of the plate 17 is substantially flush, when this plate is in locking position, with the edge of the slot 14 formed by the registering recesses 12 and 13 above described. I further provide a plate 19, shown in perspective in Fig. 5, having a depressed portion 20 and raised portions 21 and provided with a screw hole 22 at its center.

In operation the block ring 4 is placed within the tire, thereafter the halves 8 and 9 of the split rim are placed in engagement with the beads thereof and clamped together whereupon the plates 15 and 17 are brought into locking engagement one with the other so as to lock the halves of the split rim against separating axially of the tire. (In order to hold these sections of the rim together, a plurality of the plates 15, 17, and 19 are provided, distributed about the rim but only one set is described.) Thereafter the locking block 19 is seated in the slot 14 and secured by a screw, such as 23, which takes into the threaded recess 24 in the block ring 4. The raised portions 21 of the block 19 will engage the pivoted plate 17 and prevent its becoming disengaged from the plate 15, and the depressed portion 20 of this plate will prevent one half of the split rim from creeping around the periphery of the wheel with respect to the other half.

I contemplate as one of the most advantageous features of my device, that it will not be necessary to use an inner tube. Where an inner tube is used the valve 25 will be passed through an aperture in the block ring 4, as shown in Fig. 3. But where, as will be possible with my invention, no inner tube is used, the valve 25 will simply be threaded into the block ring 4 and connected directly with the interior of the tire, as shown in Fig. 1. By the use of the block ring 4 shaped to correspond to the edges of the tire and the tight clamping engagement of the halves of the split rim, the tire may be made air-tight, avoiding the use of an inner tube.

I have particularly described one of the fastening devices according to my invention. It is of course obvious that I use any number thereof equally spaced about the tire. I find that six of these fastening devices are ordinarily sufficient to hold the tire and make it air-tight, even though without an inner tube, though of course either more or less of the fastening devices may be used about the tire as desired.

It is particularly to be noted that the fastening devices are made up of thin metallic plates which project only very slightly inwardly through the split rim and that thus a demountable rim according to my invention may be applied to an ordinary felly such as now commonly in use, without modification thereof.

It is further to be noted that the block ring is preferably formed so as to accurately conform to the shape of the ordinary tire now in use so that no modification of the tire will be necessary.

Having now described my invention I claim:

1. In a demountable rim, a block ring having portions adapted to lie over the inner surfaces of tire flanges, a split rim, said parts being adapted to grip a tire therebetween, toothed engaging members for holding said split rim together and a key piece for preventing said split rim from sliding with relation to the block ring.

2. In a demountable rim a block ring having outwardly extending portions adapted to snugly fit against the inner upper surfaces of the base portions of a tire, a split rim having imperforate side flanges curved to engage the exterior of said base portions whereby to tightly grip said base portions between said block ring and said split rim, and pairs of plates on said split rim, said plates having inter-engaging teeth whereby to hold the parts of said split rim together without the use of bolts.

3. In a demountable rim, an annular block adapted to fit within a tire, a split rim, means for locking the parts of said rim against separation, and other means for locking the locking means against release and the rim sections against creeping motion relative to each other.

4. In a demountable rim, a split rim, means for locking said rim in assembled condition including ratchet teeth whereby the halves of the rim may be locked in a plurality of positions.

5. In a demountable rim, a block ring, a split rim comprising two halves, plates on one of said halves adapted to overlap the other half and having serrated edges, plates pivoted in the other half and having serrated edges for engagement with the first mentioned plates and releasable means for locking said plates in engagement to prevent the halves from separating.

6. In a demountable rim, a block ring, a split rim comprising a pair of rim sections, recesses in said rim sections adapted to register to form a slot through said split rim, engaging means in said rim sections to lock the same together, blocks having depressed portions to be seated in said slots and means for locking said blocks to said block ring.

7. In a demountable rim, a block ring, a split rim comprising a pair of rim sections, recesses in said rim sections adapted to register to form a slot through said split rim, engaging means in said rim sections to lock the same together, blocks having depressed portions to be seated in said slots and portions to lock said engaging means in operative relation, and means for locking said blocks to said block ring.

8. In a demountable rim, an annular block, a split rim, means for locking the parts of said rim in any one of a plurality of separated positions whereby to clamp a tire between said block and said rim parts, and means for preventing the unlocking of said locking means, one of said means preventing creeping of said rim sections relatively to each other.

9. In a demountable tire, an annular block adapted to fit within a tire, a split rim comprising two halves, recesses in said halves adapted to register in pairs to form transverse slots through said split rim, plates having ratchet teeth along one edge and rigidly secured to one of said halves and arranged to overlap the other of said halves, plates pivoted to the said other half and provided along one edge with similar ratchet teeth whereby when the pivoted plates are swung toward the fixed plates the ratchet teeth will interengage to lock said rim halves in any one of a plurality of separated positions, plates having depressed portions adapted to be seated in said transverse slots and bearing at their ends against said pivoted plates to hold them against said fixed plates and also hold said split rim parts from slipping with relation to each other, and means for securing the plates in said transverse slots to said annular block.

In witness whereof, I hereunto subscribe my name to this specification in the presence of two witnesses.

BERT A. STOCKING.

Witnesses:
CARRYE A. STOCKING,
CHARLES A. HUNTER.